United States Patent [19]

Malecha

[11] 4,299,137
[45] Nov. 10, 1981

[54] APPARATUS FOR MOUNTING A PLURALITY OF CONTROL MEMBERS

[75] Inventor: Richard J. Malecha, St. Louis Park, Minn.

[73] Assignee: Towmotor Corporation, Mentor, Ohio

[21] Appl. No.: 89,115

[22] PCT Filed: May 14, 1979

[86] PCT No.: PCT/US79/00320
§ 371 Date: May 14, 1979
§ 102(e) Date: May 14, 1979

[87] PCT Pub. No.: WO80/02549
PCT Pub. Date: Nov. 27, 1980

[51] Int. Cl.³ .............................................. G05G 1/14
[52] U.S. Cl. ..................................... 74/512; 180/315; 414/635
[58] Field of Search ................. 74/512; 414/635, 636; 180/335, 336, 315

[56] References Cited

U.S. PATENT DOCUMENTS

| 1,469,258 | 10/1923 | Geistert | 74/512 |
| 2,381,729 | 8/1945 | Dunham | 414/635 |
| 3,325,180 | 6/1967 | Bandini | 180/321 |
| 4,060,144 | 11/1977 | Teti | 180/77 MC |

FOREIGN PATENT DOCUMENTS 2006442 4/1969 France ............................... 414/635

Primary Examiner—John P. Silverstrim
Attorney, Agent, or Firm—Phillips, Moore, Weissenberger, Lempio & Majestic

[57] ABSTRACT

The invention relates to apparatus (10) for mounting control members including tilt cylinders (12, 14), a brake pedal (16) and, optionally, a creeper pedal (88). Problems with prior devices include the space requirements and number of parts needed to mount or anchor these members. The invention solves these problems through the use of a supporting device (18, 20, 26, 34, 38, 40, 42, 66, 76) for both the tilt cylinders (12,14) and brake pedal (16) and apparatus (90, 92, 94, 98, 104, 106) for optically installing the creeper pedal (88) on the supporting device (18, 20, 26, 34, 38, 40, 42, 66, 76) for both the tilt cylinders (12,14) and brake pedal (16) and apparatus (90, 92, 94, 98, 104, 106) for optionally installing the creeper pedal (88) on the supporting device (18, 20, 26, 34, 38, 40, 42, 66, 76). The apparatus (10) can be used principally on fork lift trucks having either standard transmissions or an optional torque converter transmission with or without creeper control.

10 Claims, 3 Drawing Figures

APPARATUS FOR MOUNTING A PLURALITY OF CONTROL MEMBERS

DESCRIPTION

1. Technical Field

This invention relates to apparatus for mounting a plurality of control members and, more particularly, to apparatus for mounting tilt cylinders, a brake pedal and, optionally, a creeper pedal on a vehicle such as a fork lift truck.

2. Background Art

Vehicles such as fork lift trucks are being used extensively for lifting and handling loads. Typically, the lift truck has a fork carriage which is supported on a mast located at the front end of the vehicle. Tilt cylinders are anchored on the truck frame to tilt and mast and hence the fork carriage for ease in picking up and carrying the loads. The lift truck also has a brake pedal which is coupled to the frame by a rotatable cross shaft to brake the vehicle in a conventional manner.

With prior lift trucks, the tilt cylinders are mounted or anchored at one part of the frame while the cross shaft supporting the brake pedal is mounted to another part of the frame. One problem with this construction is that separate mountings are utilized for the tilt cylinders and the brake pedal cross shaft, respectively. This has the disadvantage of requiring additional space for each of these separate mountings. Furthermore, parts are needed for each of these mountings and this added to the weight and cost of the vehicle.

Also, fork lift trucks are available with different kinds of transmissions. For example, the trucks can come equipped with conventional standard shift transmissions, conventional torque converter transmissions or conventional hydrostatic transmissions. Fork lift trucks having these transmissions are similar in that they each have the tilt cylinders and brake pedal, as well as separate mountings for the cylinders and pedal. However, a lift truck having the torque converter transmission or hydrostatic transmission, unlike a truck having the standard shift transmission, can optionally be equipped with a conventional creeper pedal which actuates a conventional creeper valve. In a well known manner, the creeper pedal can be depressed by the vehicle operator to shift the creeper control valve to vary the output speed of the transmission, thereby producing inching control or movement of the truck.

One disadvantage with the prior trucks is that two different types of mountings are constructed because of the availability of the different transmissions. One type includes mountings for supporting the brake pedal (and clutch pedal) of a truck having the standard transmission. The other type has mountings, different than the one type, for supporting both the brake pedal and the creeper pedal for a truck having a torque converter or hydrostatic transission. The need for these two types of mountings increases the number of parts needed for and the cost of manufacturing the lift trucks. Furthermore, while prior lift trucks have, as part of the other type of mountings, a common cross shaft for the brake pedal and creeper pedal, this cross shaft is mounted to the frame at a different area than the tilt cylinders. Consequently, the above-mentioned problem with the space requirements is also present.

DISCLOSURE OF THE INVENTION

The present invention is directed to overcoming one or more of the problems as set forth above.

In one aspect of this invention, there is provided apparatus for mounting a plurality of control members. The apparatus includes means for anchoring one of the control members, and means for supporting another of the control members on the anchoring means.

The problems with the prior art include the space requirements for various mountings for the several control members such as the tilt cylinders, the brake pedal and the creeper pedal, as well as the problem of having to manufacture different mountings depending on the use of a particular type of transmission. The solution to these problems is provided by the above-noted invention in which a control member such as a brake pedal can be supported on a means for anchoring another control member such as a tilt cylinder. Also, a yet other control member such as a creeper pedal can be mounted on the anchoring means. The present invention is advantageous in that the mountings or anchors for the tilt cylinders can also be used to mount the brake pedal and creeper pedal, thereby reducing the space requirements and number of parts needed to support these control members. Also, one basic frame and mountings can be manufactured for the tilt cylinders and brake pedal, while providing for the optional installation of a creeper pedal in the event this is desired.

BEST MODE FOR CARRYING OUT THE INVENTION

Figure 1:
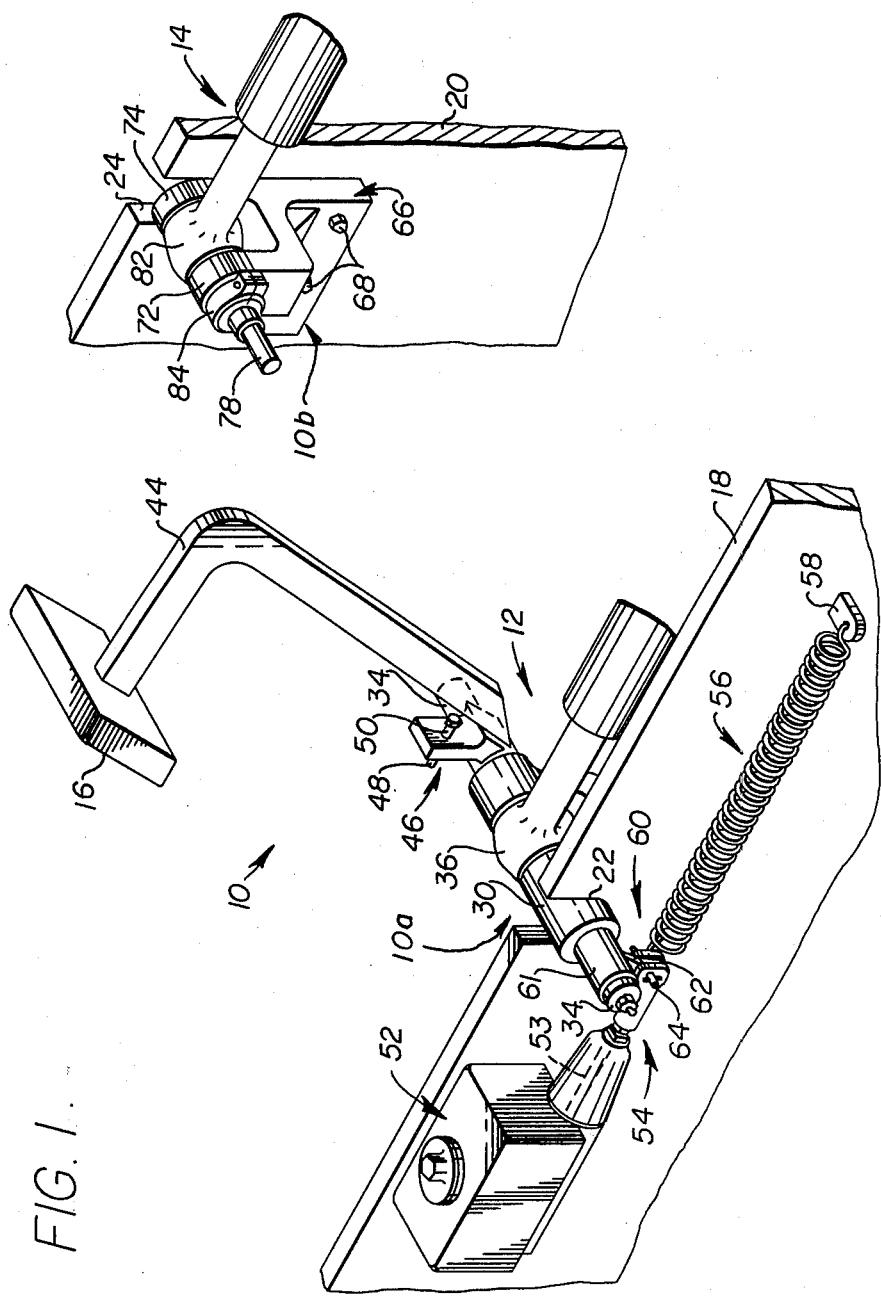
FIG. 1 is a view in perspective of an embodiment of the present invention.
Figure 3:
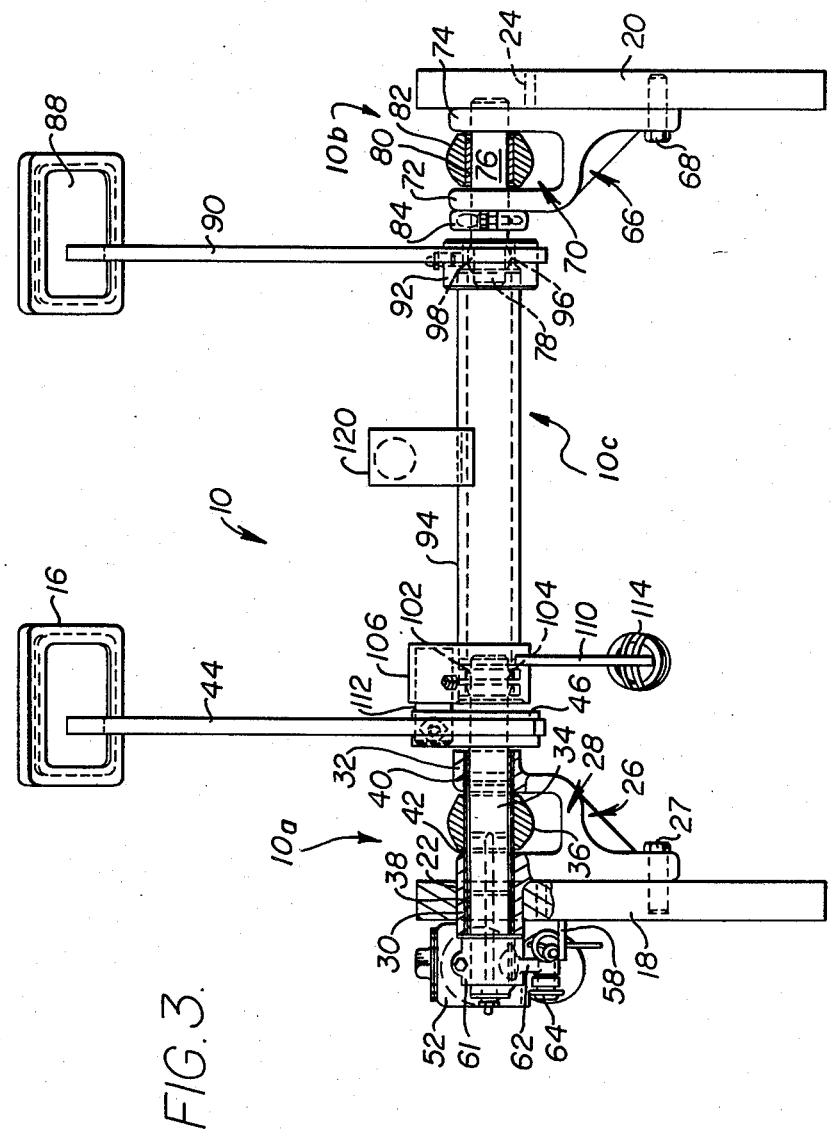
FIG. 3 is an end view, partially in cross-section, of FIG. 2.

With reference to FIGS. 1 and 3, there is shown apparatus 10 for mounting a plurality of control members on a vehicle such as a fork lift truck. The control members include, for example, a pair of tilt cylinders 12 and 14 for tilting a mast (not shown) of the fork lift truck, together with a brake pedal 16 which, when depressed, will stop the vehicle.

The truck has spaced-apart frames 18 and 20, each having a respective U-shaped slot 22 and 24. As shown in FIG. 3, means 10a is provided for commonly supporting one of the tilt cylinders and the brake pedal 16 on the frame 18, the supporting means including a bracket 26 connected to the inside of the frame 18 with bolts 27. The brake 26 has a U-shaped upper end 28 with a pair of hollow ears 30 and 32. The ear 30 extends in one direction through the slot 22 while the ear 32 extends in the opposite direction towards the frame 20. The supporting means 10a further includes an elongated shaft or pin 34 extending through the ears 30 and 32 and through a hollow spherical member 36 of the tilt cylinder 12, which member 36 is positioned between the ears 30 and 32 and is generally known as a rod eye. A bearing 38 is coupled between the pin 34 and ear 30 and another bearing 40 is coupled between the pin 34 and ear 32. An elongated sleeve 42 extends about the bearings 38 and 40 and through the member 36. The cylinder 12 can rotate about the sleeve 42 which is also, for example, press-fitted in ears 30 and 32. Thus, the cylinder 12 is rotatably anchored to the frame 18 using the sleeve 42 and bracket 26.

As illustrated in FIGS. 1 and 3, the brake pedal 16 is connected to a lever 44 which is welded to a block 46. The block 46 is fixed at a lower end to the pin 34 by, for example, welding, pinning, etc., and has an adjustment screw 48 threadably received through an opening 50 in an upper end of the block 46. A depression of the pedal 16 will therefore move the level 44 and block 46, resulting in the rotation of the pin 34 in relation to the cylinder 12. The purpose of the adjustment screw 48 will be discussed below.

A master brake fluid cylinder 52 is connected to the outside of the frame 18. A piston rod 53 of the cylinder 52 is moved by a lever shown generally at 54. A spring 56 is disposed between a bracket 58, connected to the frame 18, and the forked end 60 of the lever 54. The spring 56 biases the lever 54 to the right as shown in FIG. 1 to place the piston rod 53 of the cylinder 52 in a position for disengagement of the lift truck brakes.

A sleeve 61, which is keyed to the pin 34 to rotate therewith, has a depending flange 62 that is connected between the forked end 60 of the lever 54 by a pin 64. Therefore, the rotation of the pin 34, and hence sleeve 61, in a clockwise direction, as shown in FIG. 1, will result in movement of the layer 54 to the left against the bias of the spring 56. This, in turn, will move the piston rod 53 of the cylinder 52 to supply fluid for actuating the truck brakes.

As shown in FIGS. 1 and 3, the mounting apparatus 10 further includes second means 10b for supporting the other tilt cylinder 14 on the other 20 of the spaced apart frames. The second supporting means includes another bracket 66, similar to the bracket 26, is connected to the inside of the frame 20 by a plurality of bolts 68. The bracket 66 includes a U-shaped upper end 70 having a pair of ears 72 and 74. A shaft or pin 76 having a reduced diameter portion 78 extends through the ears 72 and 74. A bearing 80 extends about the pin 76 between the ears 72 and 74. The cylinder 14 has a spherical member 82, also known generally as a rod eye, that surrounds the bearing 80 to permit the cylinder 14 to rotate about the pin 76. Thus, the cylinder 14 is anchored by the bracket 66 and pin 76.

The pin 76 is movable axially through the ears 72 and 74 and the bearing 80 for reasons which will be described. A clamp 84 is used to clamp the pin 76 in a specific axial position for supporting another control member as will now be described.

Figure 2:
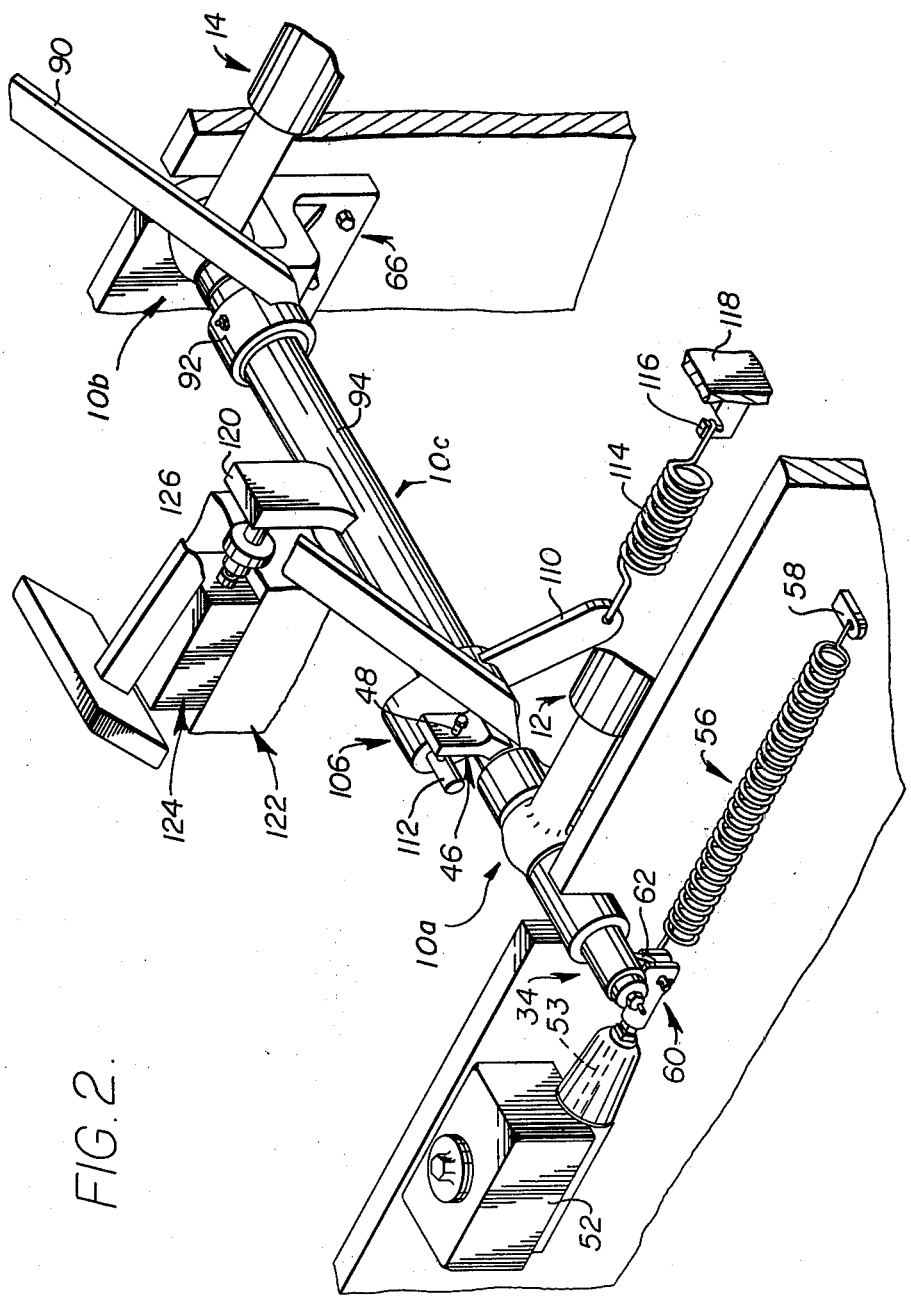
FIG. 2 is a view in perspective showing an optional feature of the embodiment of the present invention.

A creeper pedal 88 is another control member that can be included on the fork lift truck, and means 10c is provided for selectively mounting the creeper pedal on the bracket 66 of supporting means 10b. The selective mounting means includes a lever 90, as shown in FIGS. 2 and 3, connecting the pedal 88 to a hollow cylindrical member 92. A hollow cross shaft 94 has a reduced end portion 96 adjacent a spherical bearing 98 on the reduced end portion 78 of the pin 76. The cylindrical member 92 can be secured on the reduced portion 96 by, for example, welding pinning, etc. Consequently, when depressing the pedal 88, the lever 90 and cylindrical member 92 will rotate the cross shaft 94 on the bearing 98.

The cross shaft 94, at its other end 102, is supported on the pin 34 via a spherical bearing 104. A hollow lever member 106 can be secured on the end 102 of the cross shaft 94 by, for example, welding, pinning, etc. The lever member 106 has a depending arm 110 and an axially extending arm 112. A spring 114 is disposed between the arm 110 and a bracket 116 secured to a frame 118 to bias the member 106 in a counterclockwise direction as viewed in FIG. 2. The arm 112 extends spaced-apart from and axially across the adjustment screw 48, and will eventually contact the screw 48 on movement of the lever member 106 in a clockwise direction. The pedal 88, when depressed, can therefore rotate the cross shaft 94 and lever member 106 in a clockwise direction without rotating the pins 34 and 76.

A block 120 is fixed to the central portion of the cross shaft 94 to rotate with the shaft 94. Transmission 122, such as a torque converter transmission of a type well known in the art, and a creeper control valve 124, also of a type well known in the art, are positioned in proximity to the block 120. The valve 124 has a spool 126 that extends towards and is biased against the block 120. Typically, torque converter transmissions such as transmission 122 have a plurality of engageable and disengageable clutches (not shown). The transmission 122 can be shifted from neutral to reverse or forward drive positions by engaging particular clutches under the control of hydraulic fluid pressure. The control valve 124 is utilized to control the flow of hydraulic fluid causing engagement or disengagement of the clutches. As is known, in this manner the vehicle can be moved, for example, slowly forward by controlling the hydraulic fluid to reduce the pressure on the clutches and allow them to slip. The position of the spool 126 so controls the hydraulic fluid and hence clutch slippage.

Industrial Applicability

A fork lift truck having a standard transmission can be manufactured with the apparatus 10 shown in FIG. 1. The truck will have a pair of tilt cylinders 12 and 14, together with the brake pedal 16. When manipulating the truck, the vehicle operator can actuate the tilt cylinders 12 and 14 to tilt the mast and fork lift carriage to pick up and transport a load. The rod eyes 36 and 82 will rotate about the respective anchoring pins 34 and 76 without there being any movement of the brake pedal 16.

When the truck is to be stopped, the operator will depress the pedal 16. This will cause the bar 46 and pin 34 to rotate in a clockwise direction againat the bias of the spring 56. The depending flange 62 will thereby move the lever 54 to the left as viewed in FIG. 1 to activate the piston 53 in the master cylinder 52 for braking the vehicle wheels. This rotation of the pin 34 will occur relative to the rod eye 36. It will therefore be seen that the tilt cylinders 12, 14 can be anchored on frames 18, 20 together with the brake pedal 16, as shown, while sufficient travel of the cylinders 12, 14 and pedal 16 can be obtained to suitably actuate them.

The same apparatus 10 shown in FIG. 1 can be utilized with a fork lift truck having, for example, a torque converter transmission 122 and creeper control valve 124 shown in FIG. 2. In addition to the tilt cylinders 12, 14 and the brake pedal 16, the truck having the torque converter transmission 122 can also have the optional control pedal 88 coupled to the lever 90. It also should be noted that for a truck having a standard transmission, a clutch pedal (not shown) would be used in place of the creeper pedal 88.

For installation purposes, the cross shaft 94 can first be positioned through the cylinder member 92 and the lever member 106 and welded thereto. Thereafter, the clamp 84 can be loosened to slide the pin 76 (and bearing 98) partially outwardly of the frame 20 to position the cross shaft 94 between the pins 34 and 76. The pin 76 (and bearing 98) can then be slid inwardly, until the end 96 of shaft 94 is positioned on the bearing 98. The clamp 84 can then be tightened to prevent axial movement of the pin 76. Next, the spring 114 can be coupled to the arm 110 of the lever member 106 to bias the pedal 88 in the position shown.

In the operation of the FIG. 2 apparatus, the tilt cylinders 12, 14 and the brake pedal 16 can be operated exactly as described above to tilt the mast and brake the vehicle. The movement of the tilt cylinders 12, 14 and brake pedal 16 will occur relative to the cross shaft 94.

In the position of the pedal 88 and bar 90 shown in FIGS. 2 and 3, the spool 126 will be biased against the block 120 and the arm 112 will be spaced from the adjustment screw 48. In this position of the spool 126, the clutches in the transmission 122 can be fully engaged.

For inching or creep control, the vehicle operator will depress the creeper control pedal 88 to rotate the lever 90 and member 92 in a clockwise direction as seen in FIG. 2. This will rotate the cross shaft 94 and the lever member 106 in a clockwise direction relative to the pins 34 and 76. Until the arm 112 contacts the adjustment pin 48, the bar 46 will be stationary.

As the cross shaft 94 is rotated, the bar 120 will move, permitting the spool 126 to extend further outwardly of the valve 124. As the spool 126 extends more and more outwardly, the valve 124 will control the hydraulic fluid to decrease the clutch pressure, allowing the clutches to slip and producing inching or creeping movement of the truck. As the pedal 88 continues to be depressed, the arm 112 will contact the adjustment screw 48 to rotate the bar 46 in a clockwise direction and, hence, also rotate the pin 34. Consequently, the master cylinder 52 will be actuated to at least partially apply the vehicle brakes for further vehicle speed or inching control. The screw 48 can be adjusted relative to the bar 46 and arm 112 to set the position at which the arm 112 first contacts the screw 48. This will set the position at which the transmission 122 is allowed to slip before the vehicle brakes are first applied.

As already indicated, the present invention has a number of advantages. The tilt cylinders 12, 14 and brake pedal 16 of a vehicle can be supported on the same mountings or anchors, thereby reducing the space requirements and number of parts needed to support these control members. Furthermore, a single apparatus 10 can be manufactured for a vehicle having a standard transmission or, for example, a torque converter transmission in which creep control is a feature. The creeper control pedal 88 and accompanying control members including the cross shaft 94 can be optionally and easily installed on the mountings for the cylinders 12, 14 and brake pedal 16 when the torque converter transmission is to be utilized. When a standard transmission is used, a conventional clutch pedal (not shown) would be positioned in place of the creeper control pedal 88.

Other aspects, objects and advantages of this invention can be obtained from a study of the drawings, the disclosure and the appended claims.

I claim:

1. Apparatus (10) for commonly mounting a plurality of first control members (12, 14) and for selectively mounting at least one of a plurality of second control members (16, 88), the apparatus (10) comprising:
   first (18) and second (20) spaced apart frames;
   first means (10a) for commonly supporting one (12) of the first (12, 14) and one (16) of the second (16, 88) control members on the first frame (18) and including:
   a first bracket (26) secured to the first frame (18), the first bracket (26) including an upper end (28) having first (30) and second (32) spaced apart hollow ears, the first ear (30) extending in a first direction across the first frame (18) and the second ear (32) extending in a second opposite direction toward the second frame (20);
   sleeve means (42) for rotatably supporting one (12) of the first control members (12, 14) on the first frame (18) intermediate the first (30) and second (32) ears of the first bracket (26), the sleeve means (42) extending between the first (30) and the second (32) ears and being directly supported thereby;
   first (38) and second (40) bearings positioned within the sleeve means (42) and the first (30) and second (32) ears of the first bracket (26), respectively;
   first shaft means (34) for supporting one (16) of the second control members (16, 88) on the first frame (18), the first shaft means (34) extending through the sleeve means (42) and the first (30) and second (32) ears of the first bracket (26) and being rotatably supported therein by the first (38) and second (40) bearings, respectively; and
   means (44, 46) for coupling the one (16) of the second control members (16, 88) to the first shaft means (34);
   second means (10b) for supporting another (14) of the first control members (12, 14) on the second frame (20); and
   means (10c) for selectively mounting another (88) of the second control members (16, 88) on the second supporting means (10b).

2. Apparatus (10) according to claim 1 wherein the second supporting means (10b) includes:
   a second bracket (66) secured to the second frame (20), the second bracket (66) including an upper end (70) having a first (72) and second (74) spaced apart hollow ears;
   a second shaft (76) extending through the first (72) and second (74) ears of the second bracket (66) and being supported thereby;
   bearing means (80) for rotatably supporting the other (14) of the first control members (12, 14) on the second shaft (76), the bearing means (80) extending about the second shaft (76) intermediate the ears (72, 74) of the second bracket (66), the second shaft (76) being selectively movable axially through the ears (72, 74) of the second bracket (66), the bearing means (80), and across the second frame (20); and
   means (84) for clamping the second shaft (76) in a preselected axial position within the ears (72, 74) and the bearing means (80).

3. Apparatus (10) according to claim 2 wherein the selective mounting means (10c) includes:
   a cross shaft (94) having a first end portion (96) and a second end portion (102);
   first bearing means (98) for rotatably coupling the first end portion (96) of the cross shaft (94) to the second shaft (76);
   second bearing means (104) for rotatably coupling the second end portion (102) of the cross shaft (94) to the first shaft means (34);
   a cylindrical member (92) coupled to the cross shaft (94); and a lever (90) secured to the cylindrical member (92), the lever (90) having the other (88) of the second control members (16, 88) secured thereto.

4. Apparatus (10) according to claim 3 wherein the selective mounting means (10c) further includes means (106, 112, 48) for rotating one (16) of the second control members (16, 88) in response to a preselected movement of the other (88) of the second control members (16, 88), the rotating means (106, 112, 48) including:

a lever (106) secured to the second end (102) of the cross shaft (94) for rotation therewith, the lever (106) having a first arm (110) depending therefrom and a second are (112) extending axially therefrom;

an adjustment screw (48) operatively connected to the one (16) of the second control membrs (16, 88) and being adapted for engagement with the second arm (112) in response to a preset movement of the other (88) of the second control members (16, 88); and biasing means (114) for urging the lever (106) in a direction away from the adjustment screw (48).

5. Apparatus (10) according to claim 4 wherein the coupling means (44, 46) includes:

a block (46) secured to the first shaft means (34); and a lever (44) secured to the block (46), the lever (44) having the one (16) of the second control members (16, 88) secured thereto.

6. Apparatus (10) according to claim 5 wherein the first bearing means (98) is a spherical bearing (98) adapted for mounting on the second shaft (76), and the second bearing means (104) is a spherical bearing (104) adapted for mounting on the first shaft means (34).

7. Apparatus (10) according to claim 1 wherein the second supporting means (10b) includes a second shaft (76) supported on the second frame (20), and the selective mounting means (10c) includes:

a cross shaft (94) having a first end portion (96) and a second end portion (102), the first shaft means (34) extending into the second end portion (102) and the second shaft (76) extending into the first end portion (96);

first bearing means (98) for rotatably coupling the first end portion (96) of the cross shaft (94) to the second shaft (76);

second bearing means (104) for rotatably coupling the second end portion (102) of the cross shaft (94) to the first shaft means (34);

a cylindrical member (92) coupled to the cross shaft (94); and a lever (90) secured to the cylindrical member (92), the lever (90) having the other (88) of the second control members (16, 88) secured thereto.

8. Apparatus (10) according to claim 7 wherein the selective mounting means (10c) further includes means (106, 112, 48) for rotating one (16) of the second control members (16, 88) in response to a preselected movement of the other (88) of the second control members (16, 88), the rotating means (106, 112, 48) including:

a lever (106) secured to the second end (102) of the cross shaft (94) for rotation therewith, the lever (106) having a first arm (110) depending therefrom and a second arm (112) extending axially therefrom;

an adjustment screw (48) operatively connected to the one (16) of the second control members (16, 88) and being adapted for engagement with the second arm (112) in response to a preset movement of the other (88) of the second control members (16, 88); and biasing means (114) for urging the lever (106) in a direction away from the adjustment screw (48).

9. Apparatus (10) according to claim 8 wherein the coupling means (44, 46) includes:

a block (46) secured to the first shaft means (34); and a lever (44) secured to the block (46), the lever (44) having the one (16) of the second control members (16, 88) secured thereto.

10. Apparatus (10) according to claim 9 wherein the first bearing means (98) is a spherical bearing (98) adapted for mounting on the second shaft (76), and the second bearing means (104) is a spherical bearing (104) adapted for mounting on the first shaft means (34).

* * * * *